(12) United States Patent
Stankowicz

(10) Patent No.: US 10,552,480 B1
(45) Date of Patent: Feb. 4, 2020

(54) PACKAGE MANAGEMENT FOR ASSET PROCESSING

(71) Applicant: Amazon Technologies, Inc., Reno, NV (US)

(72) Inventor: Joseph Francis Stankowicz, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 251 days.

(21) Appl. No.: 15/438,637

(22) Filed: Feb. 21, 2017

(51) Int. Cl.
  *G06F 17/30* (2006.01)
  *G06F 16/71* (2019.01)
  *G06F 8/61* (2018.01)

(52) U.S. Cl.
  CPC ............. *G06F 16/71* (2019.01); *G06F 8/61* (2013.01)

(58) Field of Classification Search
  CPC ................. G06F 15/7882; G06F 3/04883
  USPC ................ 707/756, 638; 436/42; 715/251
  See application file for complete search history.

(56) References Cited

U.S. PATENT DOCUMENTS

2008/0155396 A1* 6/2008 Dubinko ............... G06F 17/217
    715/251
2012/0064975 A1* 3/2012 Gault ................... H04N 21/241
    463/42
2014/0371894 A1* 12/2014 Shan .................. H04N 21/4122
    700/94

\* cited by examiner

*Primary Examiner* — Hung T Vy
(74) *Attorney, Agent, or Firm* — Hogan Lovells US, LLP

(57) ABSTRACT

A digital asset, such as may be created as part of a game development process, can go through various stages of development where various types of processing are performed. Some of this processing requires the asset to be in specific formats. In order to ensure that a computing device has the appropriate packages installed for processing the asset, an asset processor tool can monitor the assets and send information to a package management service regarding an asset that is unable to be processed on the computing device. The package management service can attempt to determine an appropriate package for the processing, and provide that package to the computing device. In some cases the identification and installation of packages can be performed automatically, while in other cases a user may need to select a recommended package, approve installation, or provide payment, among other such options.

15 Claims, 6 Drawing Sheets

PACKAGE MANAGEMENT FOR ASSET PROCESSING

BACKGROUND

For gaming and other graphics rendering applications, asset development pipelines are used that involve processing content at different stages, such as for artistic creation and three-dimensional rendering. Different stages of the pipeline can involve different tools that process files in different formats. The processing in some cases involves the conversion of a file or object, often referred to as an "asset," to a different format. In order to perform the necessary processing and conversions, it can be necessary to have the appropriate software installed on the computer system. In many cases this requires a user to manually locate and install the appropriate software. It can also be the case, however, that the appropriate software may not be easily determinable by the user, as the software needed can vary based upon various technical information. Accordingly, it can be difficult to perform all the necessary processing using existing offerings.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches described and suggested herein relate to the processing of content on a computing device. In particular, various embodiments provide for the determination of builders, packages, and other software modules that can process assets, such as gaming assets, during the development process. During development, an asset can go through various stages according to an asset pipeline, where there can be various types of processing performed. Some of this processing can be performed using software packages that are specific to an application, type of file, configuration of device, and the like. In order to ensure that a computing device has the appropriate packages installed for the various stages of a pipeline, the developer's computing device (and the associated gaming development platform) can have tight connectivity with a package management service. When it is determined that the developer's computing device is unable to perform a determined type of processing for an asset, as may correspond to a stage of an asset pipeline, an asset processor tool executing on the device can send information to the package management service regarding the asset, the type of processing to be performed, and other such information. The package management service can attempt to determine an appropriate package, builder, or other software module to perform the processing, and provide that package to the computing device. In some embodiments the package will be identified using a set of tags utilized by the package management service, which can be determined based at least in part upon the information provided. In some embodiments the identification and installation of packages can be performed automatically such that a developer may not be aware that any action was taken and can continue work on the asset according to the asset pipeline. In other embodiments a user may need to select a recommended package, approve installation, or provide payment for a package, among other such options.

Various other such functions can be used as well within the scope of the various embodiments as would be apparent to one of ordinary skill in the art in light of the teachings and suggestions contained herein.

Figure 1:
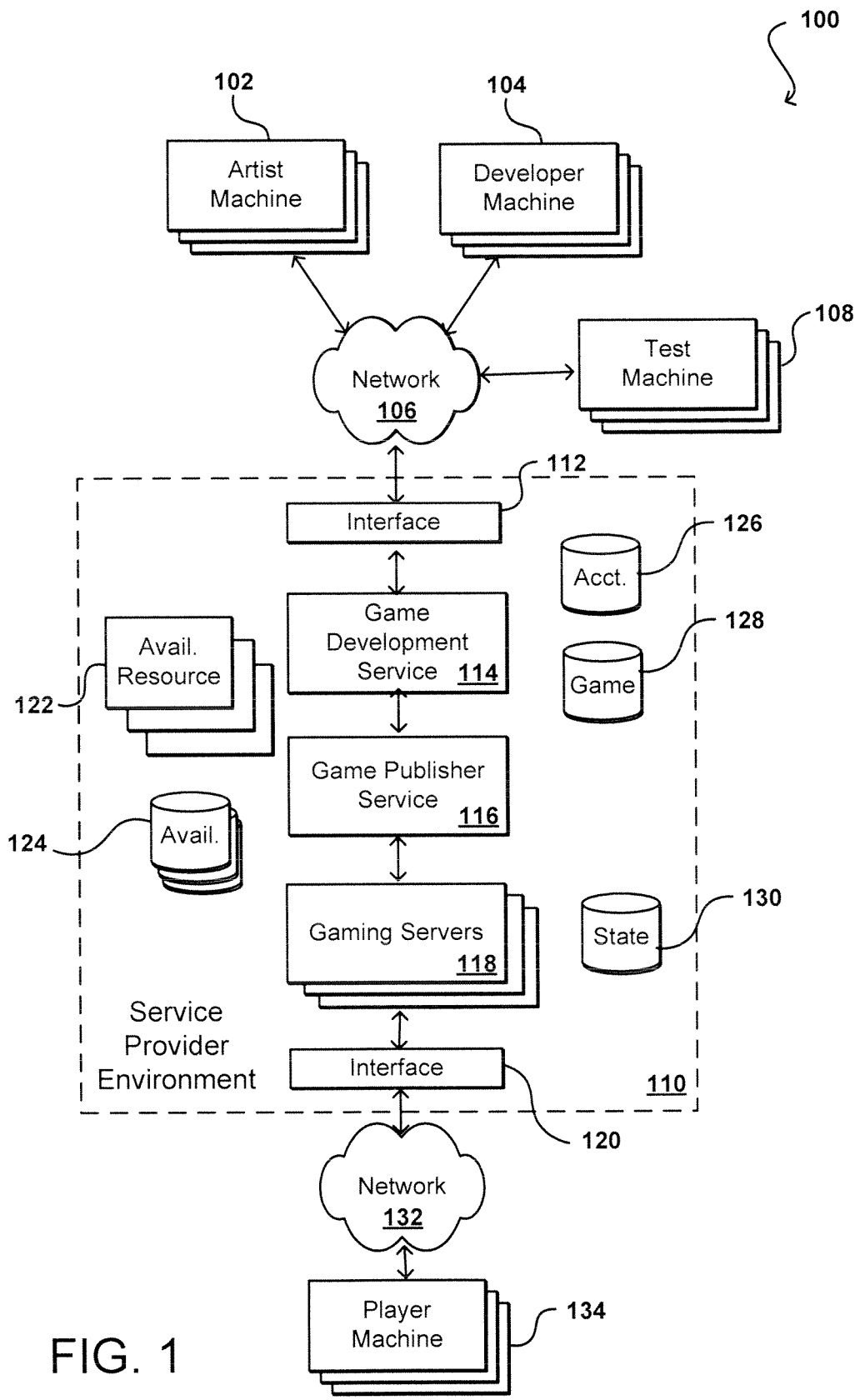
FIG. 1 illustrates an example environment in which aspects of the various embodiments can be implemented.

FIG. 1 illustrates an example environment 100 in which aspects of the various embodiments can be implemented. In this example, users are able to utilize various client device 102, 104 to submit requests across at least one network 106 to a service provider environment 108. The client devices can include any appropriate electronic device operable to send and receive requests, messages, or other such information over an appropriate network and convey information back to a user of the device. Examples of such client devices include personal computers, tablet computers, smart phones, notebook computers, and the like. There may be different types of client devices used by different types of users, as different machines 102 might be appropriate for artists generating graphical content than machines 104 that would be appropriate for developers generating code. The at least one network 104 can include any appropriate network, including an intranet, the Internet, a cellular network, a local area network (LAN), or any other such network or combination, and communication over the network can be enabled via wired and/or wireless connections. The service provider environment 108 can include any appropriate components for receiving requests and returning information or performing actions in response to those requests. As an example, the service provider environment might include computing resources 122, such as Web servers and/or application servers for receiving and processing requests, then returning content or information in response to the request. The environment can also include various repositories 124 that can be allocated for use by, or on behalf of, various users, customers, or applications of the environment.

In various embodiments, the service provider environment 108 may include various types of electronic resources that can be utilized by multiple users for a variety of different purposes. In at least some embodiments, all or a portion of a given resource, or set of resources, might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of electronic resources 122 of one or more types. These types can include, for example, application servers operable to process instructions provided by a user or database servers operable to process data stored in one or more data stores 124 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a portion of the resources 122 can be allocated in response to receiving a request to an interface layer 112 of the service provider environment 110. The interface layer can include application programming interfaces (APIs) or other exposed interfaces enabling a user to submit requests to the service provider environment. The interface layer 112 in this example can also include other components as well, such as at least one Web server, routing components, load balancers, and the like. When a request to provision a resource is received to the interface layer 112, information for the request can be directed to a resource manager or other such system, service, or component configured to manage user accounts and information, resource provisioning and usage, and other such aspects. A resource manager receiving the request can perform tasks such as to authenticate an identity of the user submitting the request, as well as to determine whether that user has an existing account with the resource provider, where the account data may be stored in at least one data store in the provider environment. A user can provide any of various types of credentials in order to authenticate an identity of the user to the provider. These credentials can include, for example, a username and password pair, biometric data, a digital signature, or other such information. These credentials can be provided by, or obtained from, a number of different entities, such as an identity provider, a key management service, a corporate entity, a certificate authority, an identify broker such as a SAML provider, and the like. In some embodiments, a user can provide information useful in obtaining the credentials, such as user identity, account information, password, user-specific cryptographic key, customer number, and the like. The identity provider can provide the credentials to the resource provider environment and/or to a client device, whereby the client device can utilize those credentials to obtain access or use of various resources in the provider environment, where the type and/or scope of access can depend upon factors such as a type of user, a type of user account, a role associated with the credentials, or a policy associated with the user and/or credentials, among other such factors.

The resource provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device to communicate with an allocated resource without having to communicate with the resource manager, at least until such time as a relevant aspect of the user account changes, the user is no longer granted access to the resource, or another such aspect changes. The same or a different authentication method may be used for other tasks, such as for the use of cryptographic keys. In some embodiments a key management system or service can be used to authenticate users and manage keys on behalf of those users. A key and/or certificate management service can maintain an inventory of all keys certificates issued as well as the user to which they were issued. Some regulations require stringent security and management of cryptographic keys which must be subject to audit or other such review. For cryptographic key pairs where both public and private verification parameters are generated, a user may be granted access to a public key while private keys are kept secure within the management service. A key management service can manage various security aspects, as may include authentication of users, generation of the keys, secure key exchange, and key management, among other such tasks.

A resource manager (or another such system or service) can also function as a virtual layer of hardware and software components that handles control functions in addition to management actions, as may include provisioning, scaling, replication, etc. The resource manager can utilize dedicated APIs in the interface layer 112, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 112 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

In this example, at least some of the resources are used to support platforms and services useful in the development and providing of electronic gaming and three-dimensional graphical content, among other such options. For example, the artist machines 102 and developer machines 104 can collaborate via a game developer service 114, which can be provided by a set of resources in the service provider environment 110 that are able to scale dynamically as discussed above. It should be understood that artists fall within the group of people referred to herein as "developers," and that the distinction in this figure is to illustrate different types of users and purposes. Unless otherwise specifically stated, developers can include not only code developers, but also artists, game designers, engineers, quality assurance personnel, content creators, musicians, and the like. The game development service can perform tasks such as to enable the checking out or locking of items for a game, the management of game files amongst developers, the providing of tools or templates to use for gaming development, and the like. The development service can also provide communication services such as messaging and content sharing, among other such options. The game development service can store information for a game to at least one game repository 128, where the repositories can include graphics files, code, audio files, and the like. The game development service 114 can also work with an account manager, or at least maintain information in an account data store 126, such that the game development service can determine which resources, including amounts or types of resources, can be allocated on a customer's behalf for the development of one or more customer games or other such content. The account data can also specify which users are authorized to work on the gaming content, including types of content accessible, actions able to be taken, and the like.

Once the game development reaches an appropriate stage in the development cycle or pipeline, as may relate to alpha or beta testing, actual release or updating, etc., the appropriate content can be made accessible to a game publisher service 116. The game publisher service 116 can receive instructions regarding the type of release, format of the release, and other appropriate information, and can cause the game content to be published to an appropriate location for access. While illustrated as part of the service provider environment, it should be understood that components such as the gaming servers or game publisher could be executed on a local user machine as well, whether one of the developer machines 104 or otherwise. In some embodiments the game content might be published and made available to one or more test machines 108, which may be associated with the customer, such that the customer can test various builds or versions of the game. In some embodiments feedback provided by the test machines 108 may be provided to the game development service 114, which can maintain testing feedback or data and make that feedback available, via logs, messages, reports, or other such mechanisms, to the developers or other persons associated with the game development. If the game is to be made available to end users, gamers, or other such persons or entities, the game publisher service might publish the game content to an array of gaming servers 118 which can run the game and enable player machines 134 to access the game content over one or more networks 132, which may be different from the network(s) 106 used for game development. This can include, for example, dedicated gaming networks, the Internet, cellular networks, and the like. The player machines 134 can communicate with the appropriate interfaces of an interface layer 120 to obtain the gaming content. In some embodiments the player machines 132 will download the gaming content for execution on the individual machines, and will upload (or otherwise communicate) gaming data, messages, and other information to the gaming servers 118, as well as to other players, social networking sites, or other such recipients. The gaming servers 118 can cause state information for the various instances of the game to be stored to at least one game state repository. This can hold state for the game as a whole or for individual game sessions, among other such options. In some embodiments the game content can be executed by the game servers and streamed in near real time to the player machines 134. In some embodiments there may alternatively be a mix of gaming content executed on the player machines and the gaming servers. Peer to peer connections among the player machines and other communications can be utilized as well in various embodiments.

Figure 2:
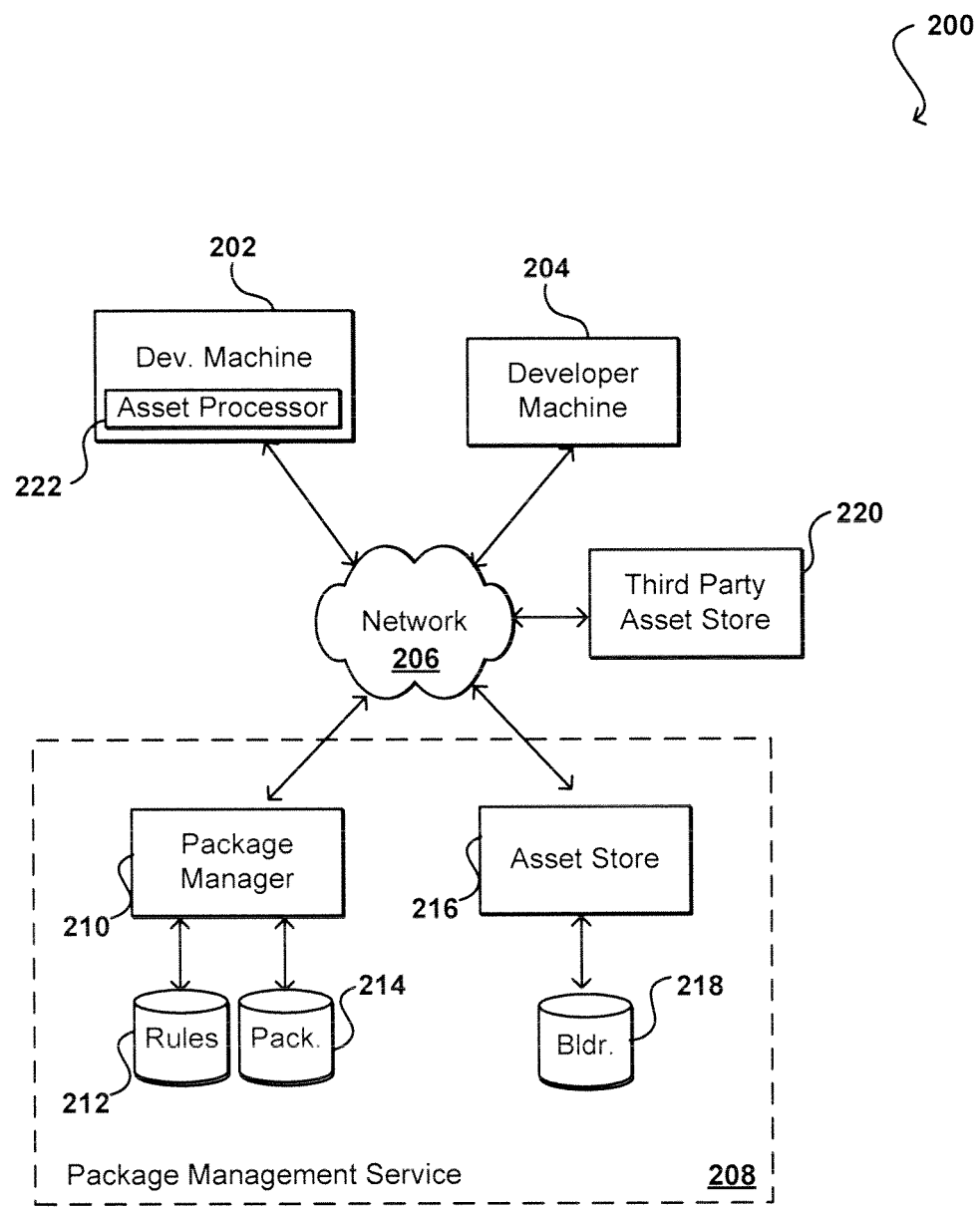
FIG. 2 illustrates an example package management service that can be utilized locate packages useful in processing specific types of assets that can be utilized in accordance with various embodiments.

During game development, the developer machines 202, 204 may need to develop graphical content using various tools and applications that can execute on the artist machines in order to process various versions of the content. As illustrated in the example system 200 of FIG. 2, in at least some embodiments this can involve communication with at least one package management service 208. The package management service illustrated may be part of a game development service, such as is discussed with respect to FIG. 1, or can be a separate service from the same or a different provider, among other such options.

As mentioned, the graphics files and other gaming content can pass through an asset pipeline during game development, where the pipelines involve transforming content, such as from formats friendly for content creators, and relevant applications, to formats that are friendly for real-time rendering and other such tasks. An example of such a pipeline relates to the lifecycle of a three-dimensional (3D) model for online gaming, as each gaming engine or 3D graphics application may have at least one respective asset pipeline. Such content often starts as a file in a format such as Maya Ascii (.ma) or Photoshop (.psd), which contains data useful for helping to build and edit 3D content. An example pipeline thus could be given by:

PDS→BMP→DDS where the asset transitions from a Photoshop document format (PDS) to a bitmap (BMP) and finally to a direct draw surface (DDS) file. The format, however, is proprietary to the 3D content creation tool Maya. As part of the pipeline, this file is then often subsequently converted to a less proprietary format, such as a filmbox (fbx) file format, that is portable format with which many development tools can load and interact. The file may then subsequently be converted to one or more file formats that can be optimized to quickly load and render on various GPU and rendering pipelines, such as may involve a direct draw surface (.dds) file format. Various other steps and formats can be used as well in example pipelines, and in some situations there can be multiple inputs and/or outputs that result in multiple possible paths through a pipeline. Further, there can be many different types of "assets" generated for a single game, as well as a variety of different asset pipelines able to convert assets from formats specific to user-friendly tools to formats that are more appropriate for rendering or general accessibility. While an example, game development service and/or platform may have built-in support for at least some of this processing, such a service generally will not be able to handle all necessary formats out of the box, particularly as new tools and options become available. Over the development cycle for a game, a developer may end up needing to mutate hundreds of intermediate or source files into different final assets. While such a service can work with an asset store, or other such offering, to obtain the appropriate builders, converters, or other software packages, or "packages," it is often still necessary to obtain the appropriate information to determine the correct package and manually obtain the package to perform the conversion and/or other related tasks. As discussed previously, in many instances a user may not have the necessary knowledge to determine the appropriate package, as the package may not depend just on the current format but also on applicable rules, device requirements, and the like.

Accordingly, approaches in accordance with various embodiments can take advantage of a packet management service 208 to automatically determine the appropriate packages, obtain those packages, and install those packages on an appropriate device, such as an artist machine 202, 204 or other such device as discussed or suggested herein. In at least some embodiments, an artist machine working with a game development service can have tight connectivity with a package manager 210 of a packet management service. An artist machine 202 can have an asset processor tool 222, or other such software, installed or otherwise accessible that can attempt to determine when the device has, or will have, an asset that will need to be modified (i.e., converted to another format) before being processed on the artist machine. In some embodiments the asset processor tool will determine that a type of file to be processed as part of the asset pipeline is not currently installed or available on the artist machine. In some embodiments the tool can provide that information to the package manager, which can make the determination. The asset processor in some embodiments can monitor the packages stored on a client device (or external hard drive, etc.), and can perform this monitoring in the context of at least one current game project on which a user of the device is working. There may be one folder location on the device for each game product, where the folder stores the assets or other content relevant to that game product. The assets created by the user may be in formats that are particular to tools utilized by that user. It may then be desirable to share that content across an entire team in one or more portable formats, such as a bitmap or TIFF format. Various other formats might be utilized as well, as may include Maya Binary, Photoshop document (.psd), direct draw surface (.dds), portable network graphics (.png), shader format, waveform audio file (.wav), MPEG-1, MPEG-2 audio layer III (.mp3), or Max 3D studio, among others. The portable assets can then be stored to one or more shareable folder locations. In at least some embodiments, the asset processor tool 222 on a device can monitor these (and other relevant) folders to determine which assets may require building, and how that building should be accomplished.

In this example, the asset processor tool 222 can determine information about the file that cannot be processed and send that information across at least one network 206 to a package manager 210 or other such component of a package management service 208. In some embodiments the asset processor 222 may need to provide other information as well, as may relate to the asset pipeline, information about the installed software, configuration or capability information for the artist machine 202, and the like. In some embodiments the asset processor tool 222 might send a request directly to an asset store 216 to obtain a builder (from a builder repository) or other package useful for converting or otherwise processing a particular type of file, object, or asset. An asset builder as used herein refers to an individual stand-alone executable that includes a registry indicating how assets are to be processed. For example, the registry for a given builder might indicate that the builder converts bitmap files into direct draw surface files. The builder might also provide information about other rules indicating how and when the builder needs to run, and any other requirements or configuration information that would make a particular builder applicable. This can include, for example, a type of device, pipeline specifications, and the like. An asset monitor can monitor the folders and determine a course of action any time a determined type of action is taken with respect to an asset, such as to change the format, contents, or other aspect of the asset. In some embodiments a builder assigned by the asset monitor can analyze its library of filters to determine how to process the asset. An asset store can refer to any source of asset builders, processors, or other modules that can be obtained to process various types of assets. The asset store can be as simple as a repository or as complex as an electronic marketplace where third party providers can offer their asset builders, among other such options. As mentioned, the asset store can be a part of, or separate from, the package management service 208, and there can be multiple asset stores utilized as well within the scope of the various embodiments.

In other embodiments the asset processor tool 222 (or other such program or module) can send the information to a package manager 210 that can analyze the information and attempt to determine whether the package manager knows what is needed to process the asset according to the determined pipeline on the identified device. This can include, for example, analyzing information for the various packages from a package data store 214 and rules for processing various assets, or types of assets, on various types of devices and/or for various pipelines from a rules repository 212. This can also include communicating with an asset store 216 to determine whether any packages are registered as asset builders for that type of asset and that satisfies any rules or requirements for the pipeline, type of device, etc. For example, a rule might indicate that bitmap files with certain metadata values will need to become a specific type of file for the platform and video card used for the specific type of developer machine. The metadata for the asset can be encapsulated then probed against a large package management service that has many packages available that can perform may different types of tasks, many of which never process assets. The asset processor can use the metadata to discover the appropriate package, obtain and unpack the package, then execute the logic accordingly.

In some embodiments, information for the identified package (or packages) can be provided to the corresponding artist machine 202. The asset processor 222 can inform a user of the machine 202 of the availability of the package to process the asset. The informing can correspond to a reporting that the machine is unable to perform current and/or future processing of the asset according to the asset pipeline and any associated rules or requirements. The asset processor can provide information about the package, and in at least some embodiments can provide a link to the identified package as available from at least an identified asset store 216. As discussed in more detail elsewhere herein, an asset processor or manager can also utilize the pipeline to determine future processing on a different machine that is performing the current processing of an asset, such as where a different user on a different machine will subsequently work on the asset, and can cause information about the appropriate package(s) to be provided for that machine as well. In some embodiments the user can select to download the package and provide any required payment, while in other embodiments the asset store may be part of the package management service such that additional payment for the package is not required, among other such possibilities. In other embodiments the package may be downloaded automatically, or at least configured to download upon user approval. Similarly, in some embodiments the identified package may be installed automatically or upon user approval, among other such options. The asset processor 222 can discover the builder, if not already directly involved in obtaining the builder, and make the builder or other package available for use. In some embodiments the package can be invoked or executed as needed, such that the user is not aware of the process of determining, locating, and installing the package and instead just continues to work on the asset according to the asset pipeline. In some embodiments an automatic download and install can be performed when the asset builder is approved for use by the package management service 208. Such an approach has advantages in that it simplifies the generation of gaming content by users who can focus on development instead of obtaining the correct packages for a given asset. Further, such an approach enables the game development platform software to provide native support for fewer packages, and thus be more lightweight, as the packages needed by a specific user for a specific device can be obtained as needed. Instead of requiring an installation of 100 GB of asset builders, most of which an individual developer will not utilize, a minimal set of standard builders can be included and others obtained on demand. Such an approach can potentially cut down on licensing fees for the various packages as well, which can reduce the cost of the service to the customer.

When a component such as an asset processor 222 on an artist machine 202 or other client device detects a new asset, or modified asset, in a game-specific folder, for example, the asset processor can search on the local device itself for a builder to process the asset. The asset processor can also (concurrently or after not locating a local builder) contact one or more package management services to attempt to obtain an appropriate builder. In some embodiments the asset builder may be aware of the builders available locally and through the asset store 216 and can make a faster determination as to the available builders. The asset processor may also know which of those builders are included under rights granted the user, device, or game development platform, in order to determine whether the builders can be obtained automatically or whether user input may be required. In some embodiments there may also be no builder currently available to process an asset, which can cause additional steps or notifications to be performed by the asset processor. In some embodiments where the asset processor does not have information about an appropriate builder, the asset processor 222 can reach out to a package management service 208 with information about the asset, pipeline, device, etc., in an attempt to locate a builder or other resource capable of processing the asset. The asset processor can also use a set of tags to attempt to locate the appropriate builder for an asset, where the package manager may provide a standardized set of tags that can be used to associate builders with the relevant assets. The set of tags can be a complex, controllable set that an asset server would need to be able to rectify to determine the appropriate asset builder. The set is controllable because the asset builder enables a user to define specific rules such as to perform a specific action using a specific builder when discovering a bitmap file with a specific naming pattern in a determined folder. There may also be metadata associated with an asset that helps to determine how to process the asset. The metadata might indicate, for example, to generate a bitmap for a texture in a specific way. The metadata thus can be used to determine and utilize a more complex set of builders. For example, there might be a general builder for processing normal bitmaps but if the metadata indicates that the asset requires HDR conversion then a different asset builder may be required.

Figure 3:
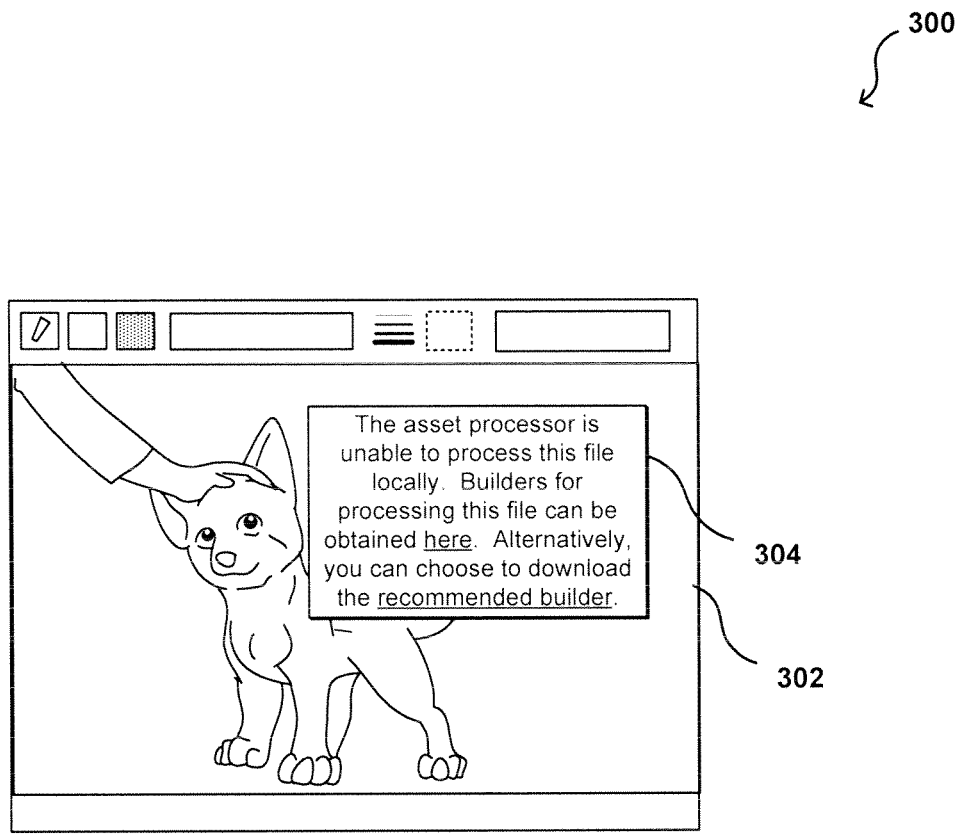
FIG. 3 illustrates an example display that can be presented in accordance with various embodiments.

As mentioned, in situations where an asset builder has been "approved" or is otherwise trusted by the package management service 208, and where any fee or approval is included under the package management service agreement, the asset builder can be obtained automatically and installed on the appropriate client devices when needed. This may also require approval from the respective user that software or packages associated with the package management service can be automatically installed on the device. In other situations at least some manual intervention may be required to determine the builder to install, including providing any approvals or payment for the selected builder. FIG. 3 illustrates an example display 300 that can be presented to an end user in accordance with various embodiments. A user might be processing an asset using a specific application 302 associated with game development. As part of the asset pipeline, an asset processor might determine a next processing step for an asset. Based on the current format of the asset, as well as any asset metadata and applicable rules for the asset or pipeline, the asset processor (or other application or process) can determine that the software currently installed locally on the device is unable to process the asset for the current step in the pipeline or at least one subsequent step in the pipeline. The asset processor can then cause an application executing on the device to generate a prompt 304 or other notification or request for the user, indicating that the software currently installed on the device is unable to perform all necessarily processing for the asset. The prompt or notification can also provide at least some information about the builder(s) or package(s) needed or available to perform the processing. In this example the prompt 304 includes two options. A first option is a link to a page or other source from which a builder can be obtained, such as where there may be multiple options determined by the asset processor to be able to perform the desired processing. The user, upon selecting that link, can be directed to a page that includes some or all of the appropriate options. The user can then select a builder and enable that builder to be obtained and installed. Alternatively, the user can select a second link of the prompt 304 to confirm that the software should cause a recommended builder to be downloaded and installed to the current device. This might be the case where the builder is approved by the service, comes with no additional cost, is the highest rated or most popular builder in the store, etc. The user can confirm this selection, which can cause the builder to be obtained, unpacked, installed, and made available to process the asset. As mentioned, in at least some embodiments the prompt can be generated upstream of the processing step of the pipeline such that the builder is already installed and available when the processing is to occur.

Figure 4:
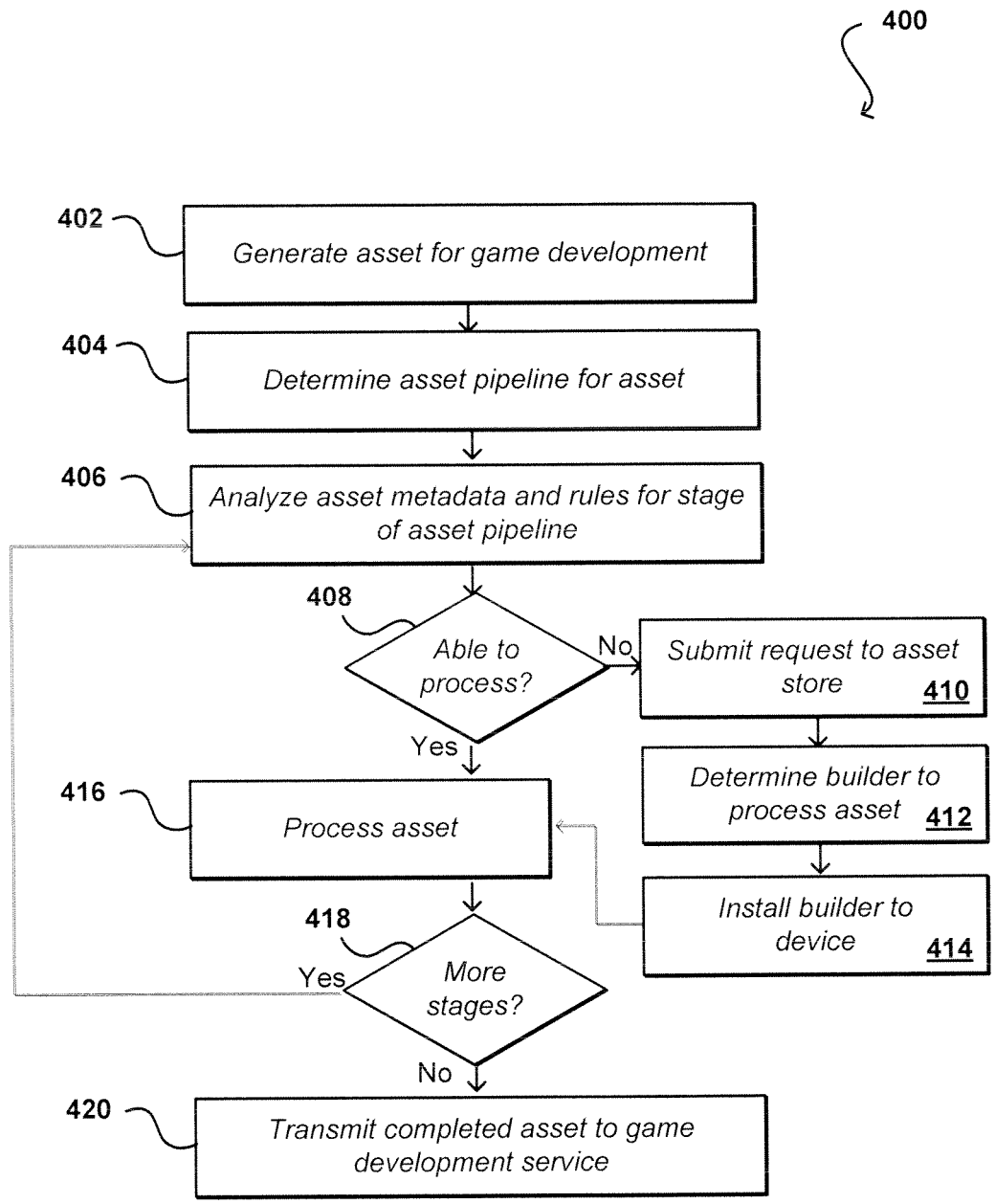
FIG. 4 illustrates an example process for obtaining a builder to process an asset that can be utilized in accordance with various embodiments.

FIG. 4 illustrates an example process 400 for obtaining packages to process assets according to an asset pipeline that can be utilized in accordance with various embodiments. It should be understood that for this and other processes discussed herein that additional, fewer, or alternative steps can be performed in similar or alternative steps, or in parallel, within the scope of the various embodiments unless otherwise stated. In this example, an asset is generated 402 as part of the development of a game or other type of digital content. As mentioned, the asset can include any appropriate type of content to be utilized in the development of the game, as may include three-dimensional graphical content, software code, and the like. The asset may be initiated on a computing machine of an artist, developer, or other person or entity associated with game development. An asset pipeline can be determined 404 that provides information about the processing that the asset will undergo during development. As discussed, this can include determining various format conversions and other processing that are typically done for assets of this type, for a certain type of task, on a certain type of machine configured a particular way, etc.

As part of the development process, the asset metadata and rules for a particular (i.e., current or upcoming) stage of the pipeline can be analyzed 406, along with information about the format of the asset, etc., in order to determine a type of processing to be performed for the asset. This can include, for example, converting the asset from a current format to a different format utilized for a next stage of the asset pipeline or lifecycle. If it is determined 408 that software installed on the device is able to process the asset for the identified stage, then the asset can be processed 416 accordingly at the appropriate point in the asset pipeline. If the device does not include the necessary software, a request can be submitted 410 to an asset store, or package management service, to attempt to determine an appropriate builder to process the asset. The request can include information such as details about the asset, the rules, configuration information, or package tags as discussed elsewhere herein. Based at least in part upon the information provided with the request, an appropriate builder to process the asset can be determined 412 and that builder provided, unpacked, and/or installed 414 to the client device. Once the device has the appropriate builder, and the stage in the pipeline is reached, the asset can be processed 416 accordingly. If it is determined 418 that there are more stages in the pipeline then the process can continue. Otherwise, if the asset has reached the last stage in the asset pipeline, the completed asset can be transmitted 420 or otherwise made available to the game development service for inclusion in the gaming content.

Figure 5:
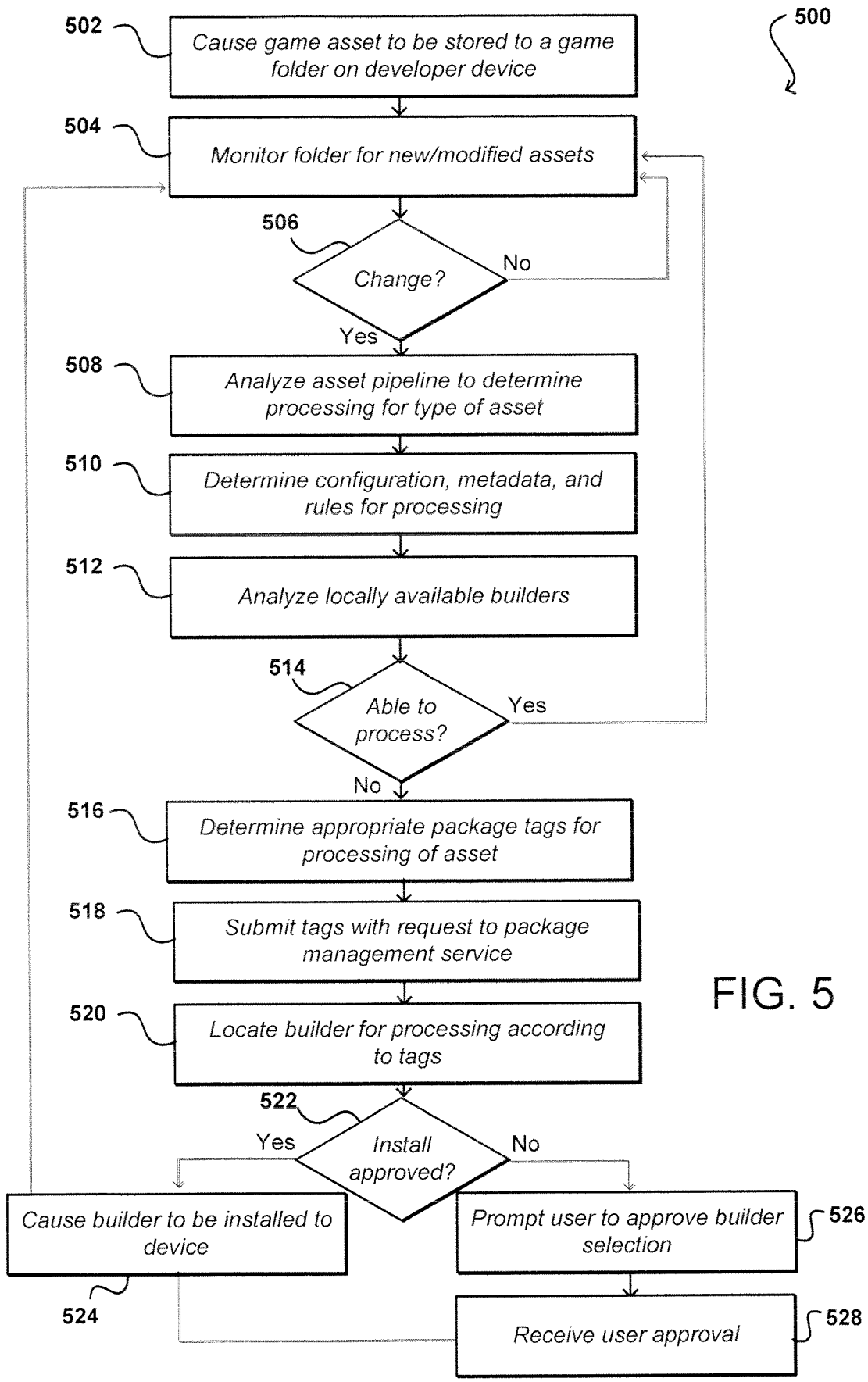
FIG. 5 illustrates an example process for determining a builder to use to process an asset that can be utilized in accordance with various embodiments.

FIG. 5 illustrates an example process 500 for obtaining packages useful for processing assets that can be utilized in accordance with various embodiments. In this example, a game asset is caused 502 to be stored to a game folder on a developer device. The asset can be generated by the developer or obtained from another developer or source, among other such options. Further, the folder can be a private or shared folder as discussed elsewhere herein. An asset monitor or other such service or component can monitor 504 the folder for new or modified assets, such as may be the result of work by the developer or processing by one or more assets. If it is determined 506 that there has been no significant change (i.e., nothing requiring processing or a change in processing) then the process can continue. If a change is detected then a relevant asset pipeline for the new or modified asset can be analyzed 508 to determine the type of processing that can be expected for that type of asset, particularly within the context of the current development environment. Information such as the device configuration, asset metadata, and rules for processing the asset can also be determined 510, which can be used to determine the type of processing to be performed for the asset at each stage of the pipeline. The asset processor can then analyze 412 the builders or packages that are available locally on the client device in order to determine whether the appropriate software is available on the device. If it is determined 514 that the software is installed on the device to perform the processing then the process can continue and the identified package can be used at the appropriate time to process the asset.

If, however, there are no packages, builders, or modules installed on the device that are able to perform the processing for the asset, a set of appropriate package tags can be determined 516 that relate to the processing of the asset. As mentioned, a package management service might publish a complex set of tags that can be used to identify packages and types of processing. These can include, for example, tags that relate to a current format, a target format, a device configuration, and other information useful in identifying the type of processing required. These tags can then be submitted 518 as search parameters with a request to a package management service, asset store, or other such package source. At least one builder can be located 520, based at least in part upon the tags, that can be used to perform the determined processing on the asset. If more than one package is identified then a package might be automatically selected based upon one or more criteria, such as rating, popularity, or price, or a user can be prompted to make a selection, among other such options. Once a package is identified, and the installation is determined 522 to be approved, the builder or other package can be caused 524 to be installed on the developer device. As mentioned, the package manager may be authorized to automatically provide the package and cause that package to be installed, while in other embodiments a user might have to approve the installation. If the installation is not approved then a user can be prompted 526 to approve the selection of the builder for installation on the device and processing of the asset, after which user approval can be received 528 and the package installed. If the user does not approve the installation then the user can pursue other options, such as to manually locate and install a package or perform another such task. The process can continue until packages are installed for all stages of the asset pipeline or the asset processing is completed, among other such options.

Figure 6:
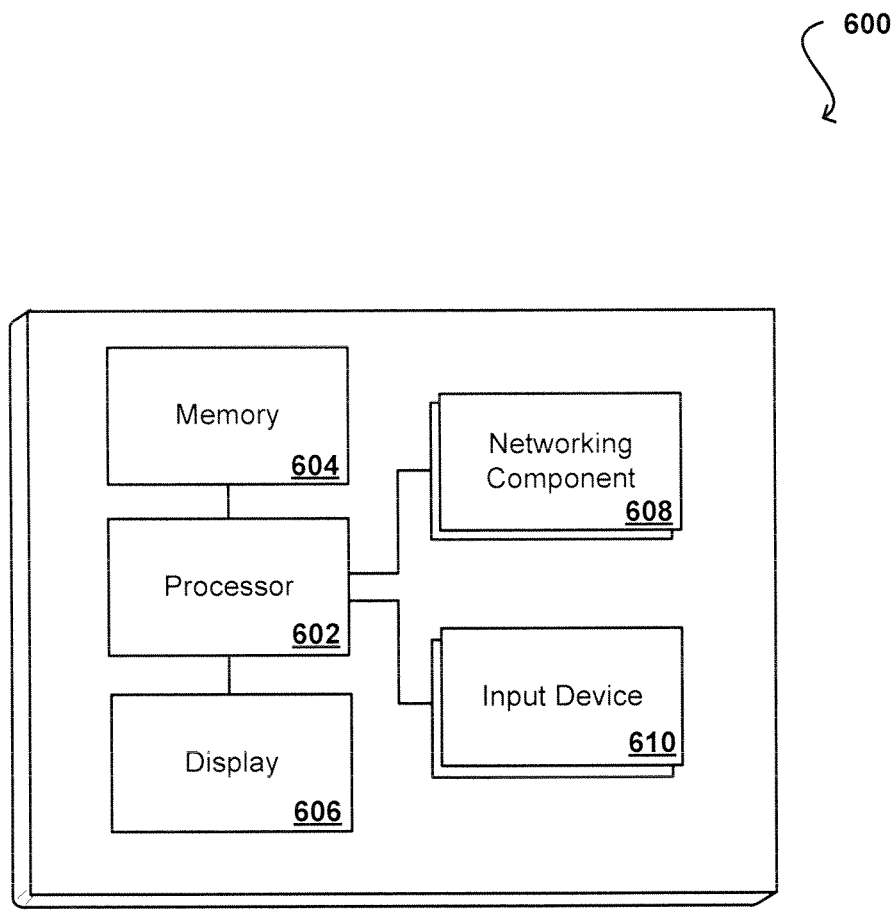
FIG. 6 illustrates example components of a computing device that can be used to implement aspects of various embodiments.

FIG. 6 illustrates a set of basic components of an example computing device 600 that can be utilized to implement aspects of the various embodiments. In this example, the device includes at least one processor 602 for executing instructions that can be stored in a memory device or element 604. As would be apparent to one of ordinary skill in the art, the device can include many types of memory, data storage or computer-readable media, such as a first data storage for program instructions for execution by the at least one processor 602, the same or separate storage can be used for images or data, a removable memory can be available for sharing information with other devices, and any number of communication approaches can be available for sharing with other devices. The device may include at least one type of display element 606, such as a touch screen, electronic ink (e-ink), organic light emitting diode (OLED) or liquid crystal display (LCD), although devices such as servers might convey information via other means, such as through a system of lights and data transmissions. The device typically will include one or more networking components 608, such as a port, network interface card, or wireless transceiver that enables communication over at least one network. The device can include at least one input device 610 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

As discussed, different approaches can be implemented in various environments in accordance with the described embodiments. As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML. XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C. C# or C++ or any scripting language, such as Perl, Python or TCL, as well as combinations thereof. The server(s) may also include database servers, including without limitation those commercially available from Oracles®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
    determining one or more rules corresponding to processing of a game asset according to an asset pipeline;
    determining that a computing device, to be used for the processing of the game asset, is unable to perform at least a portion of the processing of the game asset in a present format;
    determining, using the one or more rules and information about the present format, a processing module that when installed on the computing device will enable the computing device to process the game asset;
    obtaining the processing module from a module source; and
    causing the processing module to be installed on the computing device for subsequently processing the game asset.

2. The computer-implemented method of claim 1, further comprising:
    obtaining and causing the processing module to be installed automatically without intervention by a user of the computing device.

3. The computer-implemented method of claim 1, further comprising:
    causing a notification to be conveyed, via the computing device, regarding an availability of the processing module; and
    obtaining the processing module in response to confirmation from the user.

4. The computer-implemented method of claim 1, further comprising:
    determining, from a set of package tags and based at least in part upon the one or more rules, one or more package tags corresponding to converting the asset from the present format to a second format useful for the portion of the processing; and
    using the one or more package tags in determining the processing module.

5. The computer-implemented method of claim 1, further comprising:

monitoring one or more asset folders on the computing device; and determining whether the computing device is able to perform the processing of the game asset in response to a change in the game asset detected during the monitoring.

6. The computer-implemented method of claim 1, wherein the present format includes at least one of Maya Ascii, Maya Binary, Photoshop document, direct draw surface, filmbox, bitmap, portable network graphics, shader format, waveform audio file, MPEG-1, MPEG-2, Max 3D studio, or tagged image file format.

7. The computer-implemented method of claim 1, further comprising:

determining an asset pipeline for the game asset, the asset pipeline specifying a sequence of stages each requiring a respective portion of the processing; and determining that the computing device is unable to perform at least a respective portion of the processing of the game asset based at least in part upon the asset pipeline.

8. The computer-implemented method of claim 1, further comprising:

identifying, from an asset store, a plurality of processing modules capable of enabling the computing device to process the game asset;

providing information about the plurality of processing modules to be displayed via the computing device; and receiving a selection of the processing module from the plurality of processing modules.

9. A package management system, comprising:

at least one processor; and memory including instructions that, when executed by the at least one processor, cause the system to:

determine one or more rules corresponding to processing of a game asset according to an asset pipeline including a plurality of processing stages determine that a computing device, to be used for the processing of the game asset, is unable to perform a portion of the processing, for one of the plurality of stages, in a present format;

determine, using the one or more rules and information about the present format, a processing module that when installed on the computing device will enable the computing device to process the game asset;

obtain the processing module from a module source; and cause the processing module to be installed on the computing device for subsequently processing the game asset.

10. The package management system of claim 9, wherein the instructions when executed further cause the package management system to:

cause the processing module to be installed automatically without intervention by a user of the computing device.

11. The package management system of claim 9, wherein the instructions when executed further cause the package management system to:

cause a notification to be conveyed, via the computing device, regarding an availability of the processing module; and obtain the processing module in response to confirmation from the user.

12. The package management system of claim 9, wherein the instructions when executed further cause the package management system to:

determine, from a set of package tags and based at least in part upon the one or more rules, one or more package tags corresponding to converting the asset from the present format to a second format useful for the portion of the processing; and use the one or more package tags in determining the processing module.

13. The package management system of claim 9, wherein the instructions when executed further cause the package management system to:

monitor one or more asset folders on the computing device; and determine whether the computing device is able to perform the processing of the game asset in response to a change in the game asset detected during the monitoring.

14. The package management system of claim 9, wherein the instructions when executed further cause the package management system to:

determine an asset pipeline for the game asset, the asset pipeline specifying a sequence of stages each requiring a respective portion of the processing; and determine that the computing device is unable to perform at least a respective portion of the processing of the game asset based at least in part upon the asset pipeline.

15. The package management system of claim 9, wherein the instructions when executed further cause the package management system to:

identify, from an asset store, a plurality of processing modules capable of enabling the computing device to process the game asset;

provide information about the plurality of processing modules to be displayed via the computing device; and receive a selection of the processing module from the plurality of processing modules.

* * * * *